United States Patent [19]
Baker et al.

[11] Patent Number: 5,884,292
[45] Date of Patent: Mar. 16, 1999

[54] SYSTEM FOR SMART CARD FUNDS REFILL

[75] Inventors: Walter J. Baker, Stratford; Joseph L. Gargiulo, Trumbull; Richard W. Heiden, Huntington, all of Conn.

[73] Assignee: Pitney Bowes Inc., Stamford, Conn.

[21] Appl. No.: 57,381

[22] Filed: May 6, 1993

[51] Int. Cl.$^6$ ............................................. G06F 7/70
[52] U.S. Cl. ........................... 705/403; 705/401; 235/375
[58] Field of Search .................................... 364/401, 408; 235/375, 380, 437

[56] References Cited

U.S. PATENT DOCUMENTS

| | | | |
|---|---|---|---|
| 4,578,530 | 3/1986 | Zeidler | 178/22.09 |
| 4,849,615 | 7/1989 | Mollet | 235/380 |
| 4,908,502 | 3/1990 | Jackson | 235/437 |
| 4,978,839 | 12/1990 | Chen et al. | 235/375 |
| 5,111,030 | 5/1992 | Brasington et al. | 235/375 |
| 5,181,245 | 1/1993 | Jones | 380/23 |
| 5,220,501 | 6/1993 | Lawlor et al. | 364/408 |

*Primary Examiner*—Stephen R. Tkacs
*Attorney, Agent, or Firm*—Ronald Reichman; Robert H. Whisker; Melvin J. Scolnick

[57] ABSTRACT

A system for providing items of value, charging the items to a smart card, and for recharging the smart card. The system includes a station for providing the items of value, which may be postal services, and debiting the cost of the items to a smart card; the smart card being charged with funds equivalent data. The station also communicates with a Data Center for recharging the smart card. Users of the system communicate with the data center to request recharge of a particular smart card and in response to an authorized request the data center generates an encrypted authorization message which includes an identification number, the amount of recharge requested, and control data which preferably includes a control sum formed by adding the amounts stored in a descending register, which stores the amount available on the smart card, and an ascending register which stores the total of the amounts by which the card has been charged since initialization. Thus, the authorization message may be used only once. From time-to-time the Data Center transmits authorization messages to each station on the system. When a particular smart card for which an authorization message has been received is connected to a station, the smart card compares the control data with the control data stored on the smart card and if there is a match updates the funds equivalent data in the descending register of the smart card. To provide security against transmission of false authorization messages to a station, the authorization messages are encrypted, preferably using a public key encryption system.

19 Claims, 4 Drawing Sheets

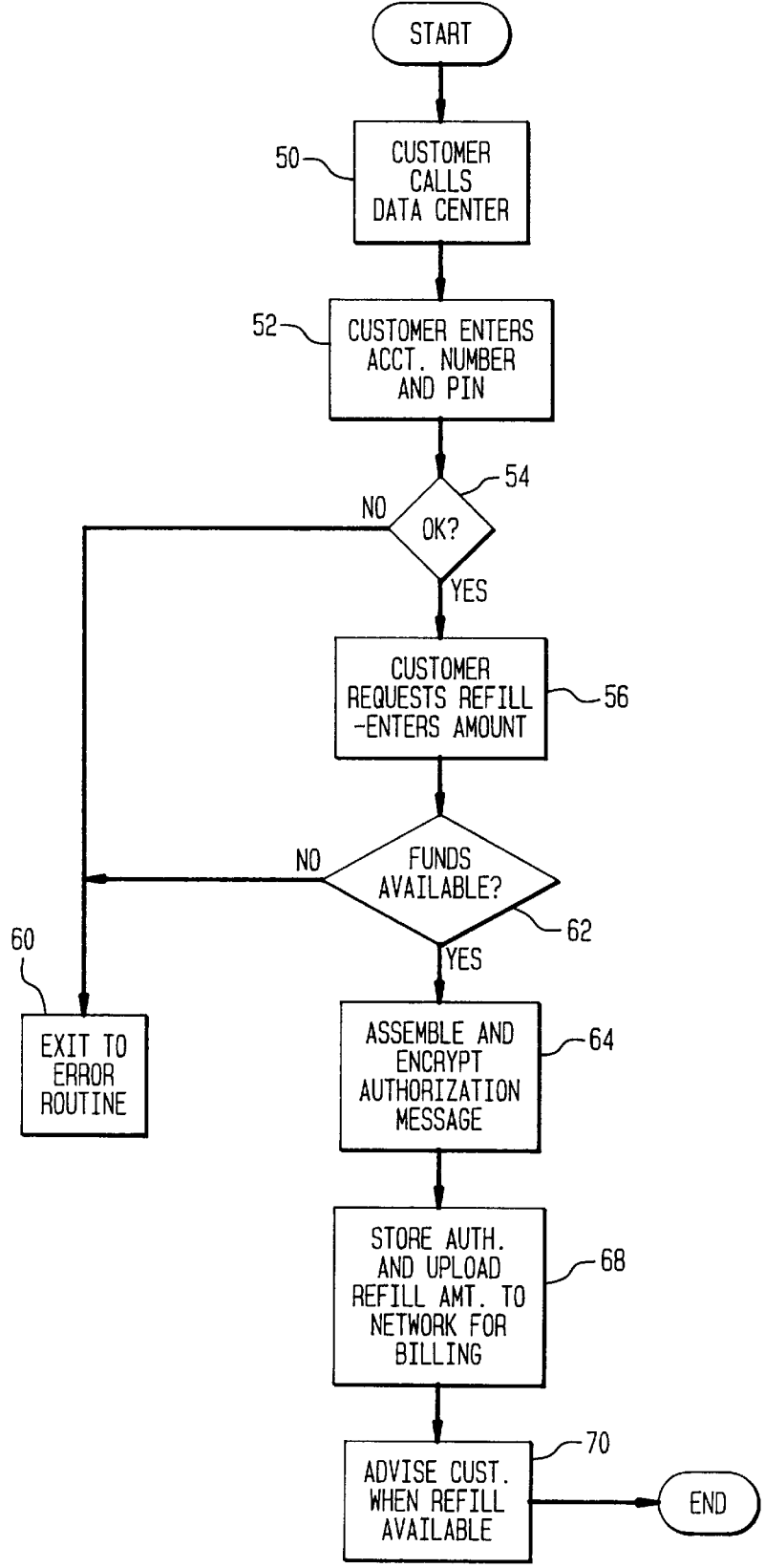

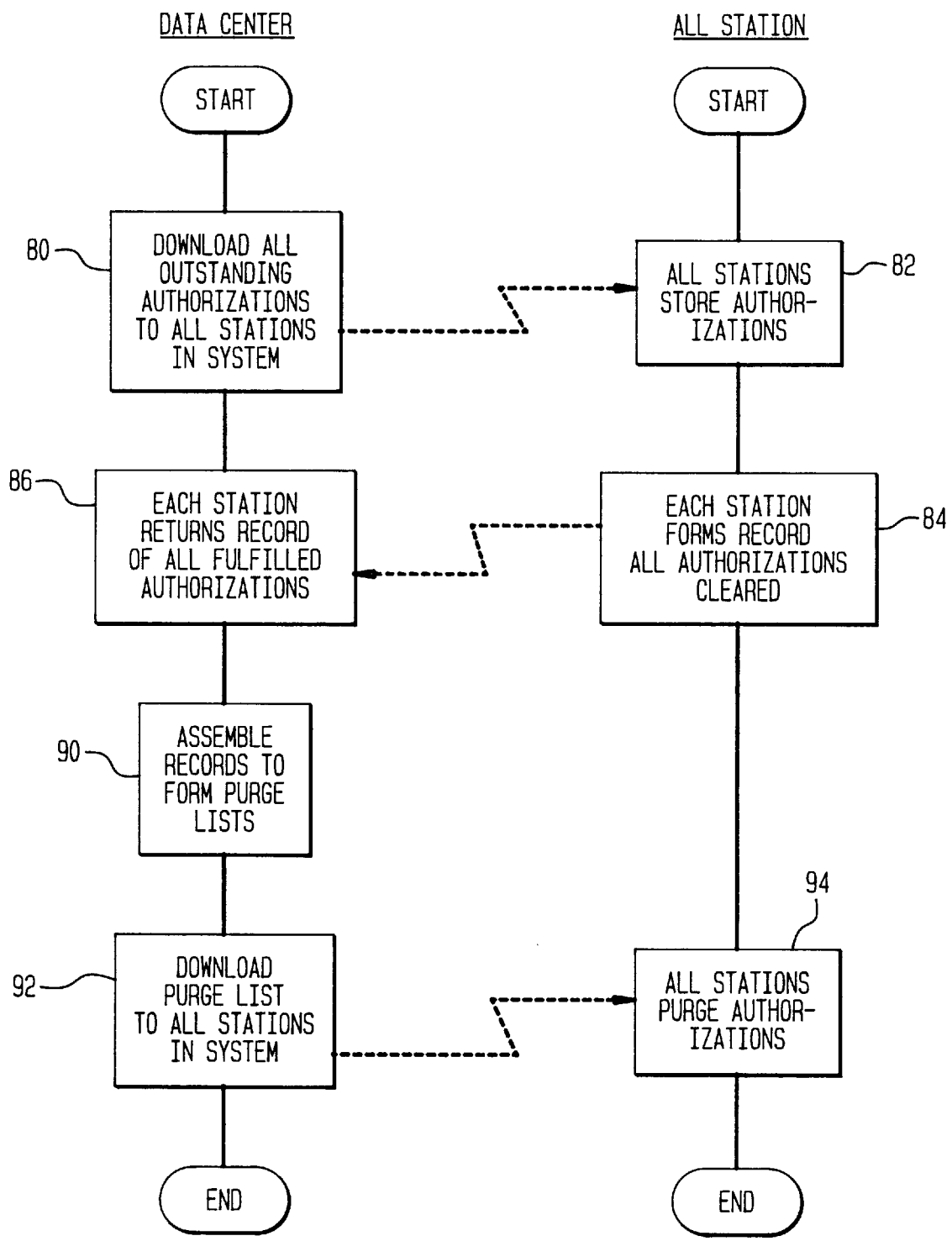

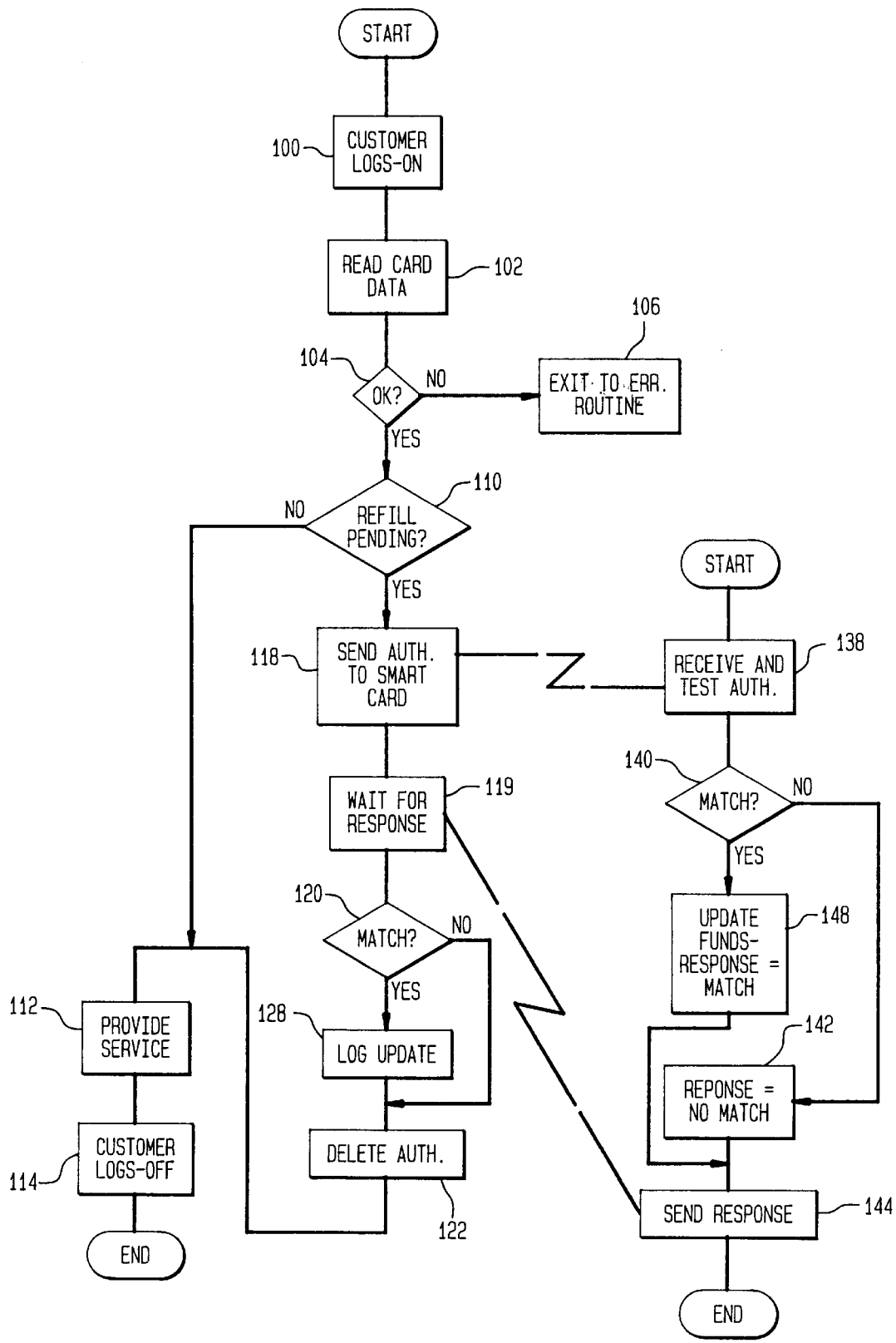

5,884,292

SYSTEM FOR SMART CARD FUNDS REFILL

FIELD OF THE INVENTION

The subject invention relates to systems and methods for refilling or recharging smart cards with funds equivalent data. More particularly, it relates to systems having a capability for recharging a smart card and which are also for dispensing items of value and debiting the cost of the items to the smart cards. (By quote items of value, herein is meant goods or services for which a charge is made.)

BACKGROUND OF THE INVENTION

Smart cards are known devices typically comprising a plastic card approximately the size and shape of a credit card, in which a microprocessor and associated memory are embedded, and which includes a mechanism for making connection to a smart card reader which has a capability to read and write data to the smart card. Because a smart card includes a microprocessor, access to data stored on the smart card may be controlled and the smart card may be used as a store of value and store funds equivalent data. The smart card stores a number representative of a credit balance. To add to this credit balance, the user of the smart card makes payment to a second party and provides the second party with information identifying the smart card, such as a personal identification number (PIN) an account number and possibly other relevant information. The second party then generates an authorization signal, which typically is a coded number unique to a particular smart card, which is recognized by the microprocessor embedded in the smart card as authorizing the increase of the funds equivalent data representing the user's balance in the memory of the smart card. By keeping the encryption keys used by the smart card secret, the user of the card is prevented from fraudulently altering the balance.

When the smart card user wishes to spend some of the balance represented in the smart card, he or she merely places the smart card in a smart card reader, which is a secure device having the capability to communicate with the microprocessor embedded in the smart card, and draws down the represented balance by reducing the amount represented by the funds equivalent data stored in the smart card memory. If the balance is being spent with a third party, the smart card reader will include a capability to increment a similar balance for the third party by the amount drawn from the smart card users balance. If the balance is spent with the party who charged the card, the balance in the users smart card balance need only be reduced. More generally, smart cards have been envisioned as replacing cash with funds equivalent data being transferred from one card to another in much the same way as electronic funds transfers now take place between financial institutions.

Generally, such use of smart cards is well known and need not be explained in further detail for an understanding of the subject invention.

For more than a year, Pitney Bowes Inc., the assignee of the present application, has operated a Convenience Mailing Center at its Technical Center in Shelton, Conn. The Convenience Mailing Center (sometimes hereinafter referred to as a station or kiosk) includes a substantially conventional postage meter, which is used by employees at the Technical Center, to frank mail pieces with the appropriate postage. The employee/user deposits funds in the kiosk, in a manner which will be described more fully below, and enters the desired amount of postage. The kiosk controller then transfers funds equivalent data equal to the desired amount of postage to the postage meter in a conventional manner and the postage meter prints the desired amount on the mail piece. Recharging, i.e. transfer of funds equivalent data, of postage meters and the operation of postage meters to frank mail pieces are well known and need not be discussed further here for an understanding of the subject invention.

To avoid the need for making change and/or handling small amounts of cash, the Convenience Mail Center operates in the manner described above to draw down a users balance stored in a smart card and transfer the equivalent amount of funds equivalent data to the postage meter. To allow users to refill or recharge the smart cards, the station also includes a bill acceptor which will accept five dollar bills and transfer funds equivalent data in five dollar increments to users' smart cards. As a result, the station accumulates, over a period of time, substantial quantities of cash which must be picked up and accounted for, and which presents a temptation to thieves and dishonest employees.

Thus, it is an object of the subject invention to provide a station for providing postal franking services, or for providing other items of value, but which does not accept cash.

BRIEF SUMMARY OF THE INVENTION

The above object is achieved and the disadvantages of the prior art are overcome in accordance with the subject invention by means of a method and apparatus which includes a station for providing items of value and debiting the cost of the items against a balance maintained in a smart card. The station also has a capability to recharge the smart card with funds equivalent data. The station comprises a controller, a smart card reader communicating with the controller, an input device for input of control signals to the controller for controlling the provisions of items of value, and a mechanism responsive to the controller for dispensing the items of value. The system also includes a Data Center which generates an authorization signal unique to particular smart cards, and a communications link connecting the station and the Data Center to transmit the unique authorization signal to the station. The station responds to reception of the authorization signal and connection of the corresponding particular smart card to recharge the smart card.

In accordance with one embodiment of the subject invention the items of value include franking of mail pieces.

In accordance with another embodiment of the subject invention, the system includes a plurality of stations and, from time-to-time, the Data Center transmits a group of authorization signals to all of said stations, and wherein the authorization signals are one-time signals which can only be used to recharge the particular card a single time.

In accordance with another embodiment of the subject invention the authorization signal includes an encryption message, the encryption message comprises control data relating to the particular card for identifying the particular card.

In accordance with another embodiment of the subject invention, each station stores the authorization signal and upon connection of one of the particular cards corresponding to one of the stored authorization signals, the station recharges the corresponding card.

In accordance with another aspect of the subject invention, users of the smart card communicate with the Data Center over the telephone or similar public access network to request recharge of particular cards, and the users receive a bill for use of the network, the bill including a surcharge for recharge of the card.

Thus, it could be seen that the above object is advantageously achieved by the subject invention. Other objects and advantages of the subject invention will be readily apparent to those skilled in the art from consideration of the attached drawings and the detail description set forth below.

BRIEF DESCRIPTION OF THE DRAWINGS

FIG. 2 is a flow chart of the operation of the Data Center of the subject invention in generating an authorization signal.

FIG. 3 is a flow chart of the communication of authorization signals between the Data Center and the stations of the system of the subject invention.

FIG. 4 is a flow chart of the operation of a station of the subject invention in recharging a smart card.

Figure 1:
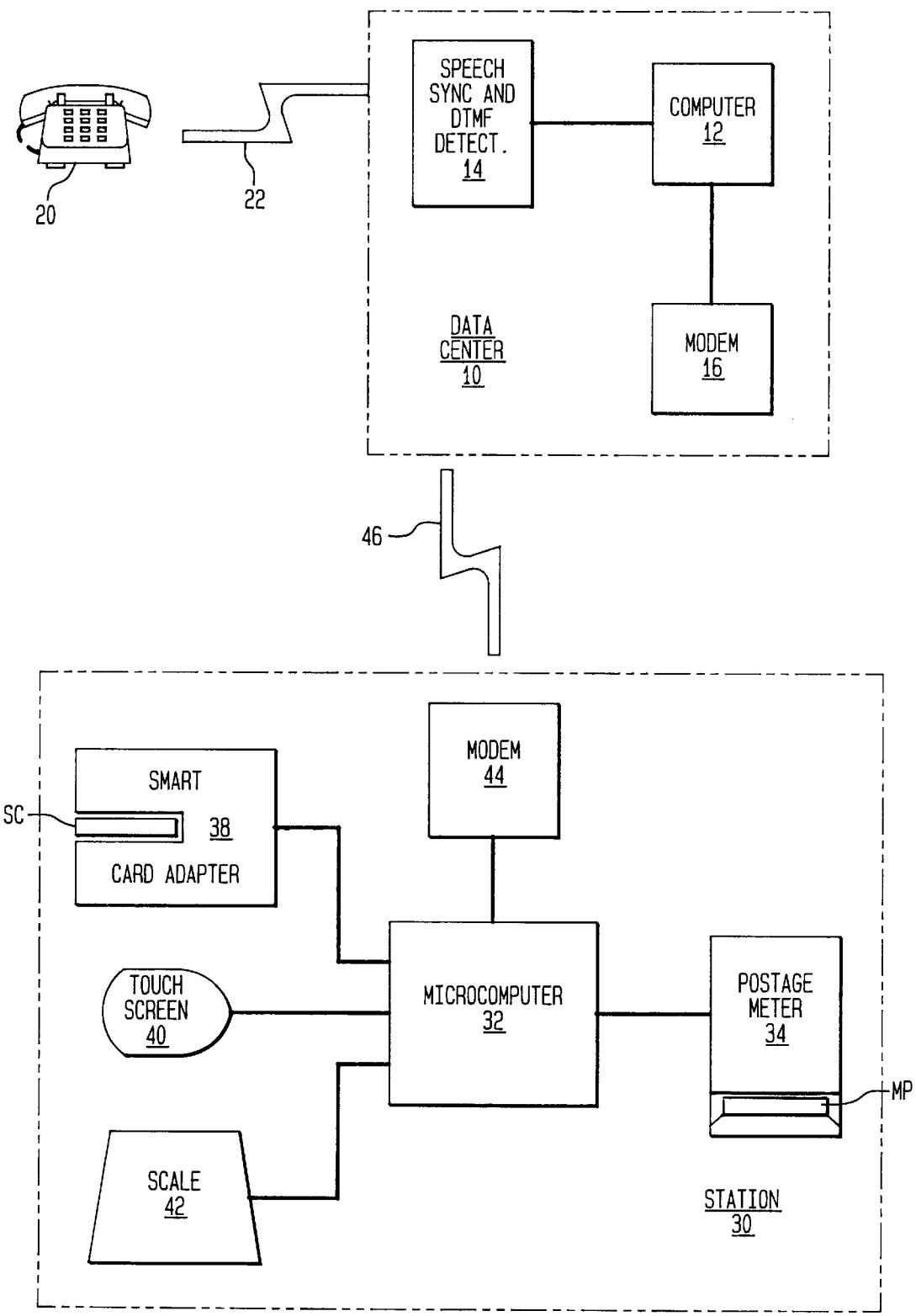
FIG. 1 is a schematic block diagram of a system in accordance with the subject invention.

DETAILED DESCRIPTION OF PREFERRED EMBODIMENTS OF THE SUBJECT Invention

Turning to FIG. 1, a Data Center 10 includes a computer 12 for maintaining accounts for users of the system and for generating authorization codes as will be described further below. Computer 12 receives requests for recharge of particular smart cards through a DTMF (Dual Tone Multi-Frequency) detector and speech synthesizer 14 and communicates with stations on the system through modem 16.

Users who wish to request recharge of their smart card access Data Center 10 through conventional telephone sets 20 over the switched public access telephone network 22.

FIG. 1 also shows a typical station 30 on the system. Station 30 includes a controller, which is preferably microcomputer 32, but which may be a programmable controller, a hard wired controller or any other suitable form of control mechanism, for control of the operation of station 30, as will be described below. Microcomputer 32 controls postage meter 34 to print requested amounts of postage on mail pieces MP and communicates with smart card reader 38 to debit smart card SC for the amounts of postage requested and/or to recharge smart card SC. Touch-screen 40 also communicates with microcomputer 30 to allow a user to input control signals for controlling the services provided by station 30.

Station 30 also, optionally, includes scale 42 to provide microcomputer 32 with the weight of mail piece MP.

Microcomputer 32 is programmed to receive postal. information from touch-screen 40 and, optionally, weight information from scale 42 and to compute appropriate postage values to set postage meter 34. Software for computing postage values is well known, as is software for transferring funds equivalent data from smart cards. Once the appropriate postage value for a mailing transaction or transactions is computed and the appropriate amount input from smart card SC through smart card reader 38 to microcomputer 32, these funds may be transmitted from microcomputer 32 to postage meter 34 in a conventional manner, and postage meter 34 may then be used to print postal indicia on the mail piece or pieces. Accordingly, further description of the operation of station 30 in printing postal indicia is not believed necessary for an understanding of the subject invention.

Microcomputer 32 also communicates with Data Center 10 through modem 44, communications link 46 and modem 16 to provide a capability for recharging smart card SC, as will be described further below. In the embodiment shown in FIG. 1, modems 44 and 16 are conventional, and communications link 46 is preferably a switched telephone network. However, communication between computer 12 and microcomputer 32 may be carried out in any suitable manner without the departing from the subject invention.

To recharge a particular smart card SC, Data Center 10 generates an authorization signal in the form of an encrypted message including control data which identifies the particular smart card SC, the amount by which the card is to be recharged, and information which is stored in smart card SC and updated each time the card is recharged so that the authorization signal is a one-time signal which may be used only to authorize a single recharging operation. From time to time Data Center 10 downloads all the authorization signals which have been generated in response to requests by users of the system to all stations on the system. Each station then stores the authorization signals. When a smart card SC is connected to a station 30, station 30 checks to determine if an authorization for that particular smart card SC has been received and, if so, recharges the particular smart card SC by the amount indicated in the authorization signal.

FIG. 2 shows the operation of Data Center 10 in generating an authorization signal. At 50, a customer calls Data Center 10 through telephone set 20, network 22, and DTMF detector and speech synthesizer 14 to establish connection with computer 12. Computer 12 prompts the user with synthetic speech and/or prerecorded messages, and the user inputs data through telephone set 20 by generating DTMF tones through the keypad of telephone set 20. Such voice response systems are well known and widely used and need not be discussed further here for an understanding of the subject invention.

At 52, the customer enters an account number and a Personal Identification Number (PIN), and at 54, Data Center 10 compares the account number and the PIN to determine if this is an authorize user. If there is not correspondence between the account number and the PIN then at 60 computer 12 exits to an error routine which preferably allows a predetermined number of retries before hanging up.

Assuming that the customer is an authorized user, then at 56 the customer is prompted to continue and enters a recharge request, which preferably includes the amount by which smart card SC is to be recharged.

Then at 62, computer 12 tests to determine if funds are available to the user for recharging smart card SC. If not, computer 12 again exits to an error routine.

Funds may be available to a user of the system in any of several ways. Most simply, the user may establish an account, either a deposit account or a credit account, and maintain either a cash balance or a credit line with the operator of the system. Testing the availability of funds is then simply no more then testing whether the customer has a sufficient balance to cover the recharge requested. In systems where a customer maintains a deposit or credit account, recharges may be requested from any telephone station or may be requested and carried out in a single transaction through station 30. In another embodiment, the customer may provide a credit card (or debit card) number and the recharge charged to that card.

A preferred alternative for establishing funds availability is the use of billing systems implemented by the operator of network 22, such as the well known "900 number" system. In such systems the network operator adds a surcharge to the cost of a communication over the network and remits the surcharge, less a handling charge, to the recipient of the call. Preferably, Data Center 10 would have a plurality of lines connecting it to network 22, each of the lines being associated with a different amount. In such a system, determining funds availability is achieved by assuring that the calling number is a number which the user has authorized to request recharge of the particular smart card SC. The technology for making the calling number available to the call recipient is commercially available from operators of the switched telephone network and need not be discussed further here for an understanding of the subject invention.

Once Data Center 10 determines that funds are available then at 64, computer 12 assembles and encrypts an authorization message to be transmitted to each station 30 on the system. The authorization method includes an identification number, which may be the account number and which is stored on smart card SC, the amount of recharge requested, and control data which is also stored on smart card SC and which is updated with each recharge transaction so that the authorization method is a one-time method.

In order to provide security against the fraudulent transmission of false authorization messages, at least a portion of the authorization message is encrypted.

Preferably, the authorization method is encrypted using a public key encryption system. Such systems include a pair of encryption keys, either of which is used to decode messages encrypted with the other key. By using a public key system, compromise of smart card SC will not compromise the ability to generate valid authorization messages.

Then at 68, Data Center 10 stores the encrypted authorization messages, and at 70 advises the customer when the recharge will be available at each station 30.

FIG. 3 shows the operation of Data Center 10 and each station 30 in communicating authorization messages. At 80, Data Center 10 downloads all outstanding authorization messages which have been generated since the last communication with each station 30 to each station 30 in the system. At 82, each station 30 stores all authorization messages. At 84, each station 30 assembles a record of authorization messages which have been cleared, i.e. of particular smart cards SC which have been recharged in response to an authorization message, and at 86, each station 30 returns the record to Data Center 10. At 90, Data Center 10 assembles all records to form a purge list, and at 92, downloads the purge list to each station 30 in the system. Then, at 94, each station 30 purges all authorization messages identified in the purge list.

Use of such purge lists is desirable since it is expected that some users will never use some of stations 30 and, unless some method of purging authorization messages is provided, such messages will accumulate without limit and over time fill available storage media.

Alternatively, authorization messages may include an expiration date. However, it will still be necessary for each of stations 30 to advise Data Center 10 when an authorization message is cleared in order to handle the inevitable claims for refund by users who, for some reason, do not use a requested recharge.

FIG. 4 shows the operation of station 30 in refilling a particular smart card SC. At 100, a customer logs onto station 30 using touch-screen 40. During the logon process, the customer will be prompted to insert smart card SC into smart card reader 38. Then at 102, microcomputer 32 reads the smart card data including the identification number and the control data. At 104, microcomputer 32 checks to determine if the identification number matches the PIN entered by the user during the logon process. If there is no match, the program exits to an error routine at 106, which preferably allows a predetermined number of retries.

If the user has successfully logged on, then, at 110, microcomputer 32 tests to determine if a refill is pending by comparing the identification number with the stored authorization messages which have not been cleared. To facilitate this, it is preferred that the identification number in the authorization message not be encrypted. If no refill is pending at 110, microcomputer 32 goes to 112 and enters a routine to provide postal services in a conventional manner as described above. Then, at 114, the user logs off and the transaction ends.

Assuming that a recharge is pending, then, at 118, the authorization message is sent to smart card SC. Then, as will be described further below, the microcomputer in smart card SC verifies the refill by decrypting the encrypted authorization message and comparing the control data stored on smart card SC with the control data in the authorization message.

Preferably, the control data is a control sum, which is formed by adding the contents of an ascending register and a descending register stored in smart card SC. The descending register stores the total amount of funds equivalent data available in smart card SC. When funds are added to smart card SC, they are added to the funds equivalent data stored in the descending register, and when funds are spent from smart card SC they are subtracted from the descending register and added to the ascending register. Thus, the control sum register represents the total amount of funds with which smart card SC has been charged since it was initialized. If the control sum stored on smart card SC does not match the control sum in the authorization message, smart card SC assumes that smart card SC has been recharged at another of stations 30 or that the authorization message is invalid for some other reason.

The use of a control sum as the control data is preferred since Data Center 10 may maintain records of the total amount by which a particular smart card SC has been charged and there is no need for the user to input a balance when requesting a recharge. However, it is also within the contemplation of the subject invention that the control data may include the current balance and/or a count of the number of recharges received by a particular smart card SC.

Then, at 119, microcomputer 32 waits for a response from smart card SC. Assuming that the response indicates that the control sum matched the authorization messages at 128, microcomputer 32 logs the update to show that the authorization message has been cleared and then goes to 122 to delete the authorization message. Microcomputer 132 then goes to 112 to provide postal services, and to 114 for customer logoff, as described above. If the response indicates no match, microcomputer 122 goes directly to 122.

Turning to the operation of smart card SC, at 138, smart card SC receives the authorization message, decrypts it and tests the control data against information on smart card SC. At 140, if no match is found, the microcomputer goes to 142, forms a response indicating no match and, at 144 sends the response to microcomputer 32. Otherwise, at 148, the microcomputer updates the funds stored on smart card SC, forms a response indicating that a match was found, and goes to 144. The above description of preferred embodiments of the subject invention has been provided by way of illustration only, and other embodiments of the subject invention will be apparent to those skilled in the art from consideration of the above description and the attached drawings. Particularly, it will be apparent that the present invention may be used to provide items of value other than postal services. Accordingly, limitations on the subject invention are to be found only in the claims set forth below.

What is claimed is:

1. A system for providing items of value, comprising:
   a) a station for providing said items of value and debiting the cost of said items of value to a smart card, said smart card being charged with funds equivalent data, and for recharging said smart card, said station further comprising:
      a1) a controller
      a2) a smart card reader operatively connected to said controller;
      a3) input means for input of control signals to said controller controlling provision of said items of value; and
      a4) providing means, responsive to said controller, for dispensing said items of value;
   b) data processing means for generating an authorization signal unique to a particular smart card
   c) communication means for connecting said station and said data processing means responsive to said data processing means for transmitting said unique authorization signal to said station; wherein
   d) said station is responsive to reception of said authorization signals and connection of said particular smart card to said card reader to recharge said smart card, wherein, from time to time, said data processing means transmits a plurality of said authorization signals to each of said stations, through said communications means, and, wherein said authorization signals are one-time signals which can only be used to recharge said particular smart card a single time.

2. A system as described in claim 1, wherein said items of value comprise franking of mail pieces.

3. A system as described in claim 1, wherein said authorization signal comprises an encrypted message.

4. A system as describe in claim 3, wherein said encrypted message comprises control data relating to said particular smart card for identifying said particular smart card.

5. A system as described in claim 4, wherein said control data comprises a control sum.

6. A system as described in claim 3, wherein said message is encrypted using the private key of a public key encryption system and decrypted by said smart card using the public key of said encryption system, whereby compromise of said smart card will not comprise the capability to generate said encrypted message.

7. A system as describe in claim 1, further comprising a plurality of said stations, wherein, from time-to-time, said processing means transmits a plurality of said authorization signals to each of said stations through said communications means; each of said stations storing said plurality of authorization signals and, upon connection of one of said particular smart card corresponding to one of said stored authorization signals recharging said corresponding particular smart card and deleting the corresponding one of said stored authorization signal.

8. A system as described in claim 7, further comprising means for purging said stored authorization signals.

9. A system as described in claim 1, wherein users communicate with said data processing means to request recharge of particular smart cards over a telephone or similar public access network.

10. A system as described in claim 9 wherein said user receives a bill for use of said telephone or similar public access network; said bill including a surcharge for recharge of said particular smart cards.

11. A station for providing items of value for franking mail pieces and debiting the cost of said items of value to a smart card, said smart card being charged with fudns equivalent data, and for recharging said smart card, comprising:
   a) a controller;
   b) a smart card reader operative connected to said controller;
   c) input means for input of contorl signals for contolling provision of said items of value to said controller;
   d) providing means, responsive to said controller for dispensing said items of value;
   e) receiving means for receiving encrypted authorization signals unique to particular smart cards, wherein said encrypted message comprises a control sum relating to said particular smart card for identifying said particular smart card; wherein,
   f) said station is responsive to reception of an authorization signal and connection of a corresponding smart card to said card reader to recharge said corresponding smart card.

12. A station as described in claim 11, wherein said encrypted message comprises control data relating to said particular smart card for identifying said particular smart card and wherin said control data comprises a control sum.

13. A station as described in claim 11, wherein said message is encrypted using the private key of a public key encryption system and decrypted by said smart card using the public key of said encryption system, whereby compromise of said smart card will not comprise the capability to generate said encrypted message.

14. A method of recharging smart cards, with funds equivalent data comprising the steps of:
   a) receiving a request to recharge a particular smart card;
   b) generating an encrypted authorization signal unique to said particular smart card, wherein said encrypted signal comprises control sum relating to said particular smart card for identifying said particular smart card,
   c) transmitting said authorization signal to a station for providing items of value to users of said smart cards and debiting the cost of said items of value to said smart cards; said station then,
   d) responding to receipt of said authorization signal and connection of said particular smart card to said station to recharge said particular smart card with funds equivalent data.

15. A method as described in claim 14, wherein said items of value comprise franking of mail pieces.

16. A method as described in claim 14, wherein said encrypted message comprises control data relating to said particular smart card for identifying said particular smart card.

17. A method as described in claim 16, wherein said control data comprises a control sum.

18. A method as described in claim 14, wherein said message is encrypted using the private key of a public key encryption system and decrypted by said smart card using the public key of said encryption system, whereby compromise of said smart card will not comprise the capability to generate said encrypted message.

19. A method as described in claim 14, wherein a user inputs said request over a telephone or similar public access network and said user receives a bill for use of said network said bill including a surcharge for recharging of said particular smart card.

* * * * *